CIRCUIT ARRANGEMENT IN A COLOR TELEVISION RECEIVER FOR CONVERTING A TELEVISION SIGNAL RECEIVED INTO A DOT-SEQUENTIAL SIGNAL

Filed Jan. 15, 1962 3 Sheets-Sheet 1

INVENTOR
FRANCISCUS F.T. VAN ODENHOVEN.
JAN DAVIDSE
BY Frank R. Jeifari
AGENT

CIRCUIT ARRANGEMENT IN A COLOR TELEVISION RECEIVER FOR CONVERTING A TELEVISION SIGNAL RECEIVED INTO A DOT-SEQUENTIAL SIGNAL

Filed Jan. 15, 1962

INVENTOR
FRANCISCUS F.T. VAN ODENHOVEN.
JAN DAVIDSE
BY [signature]
AGENT

INVENTOR
FRANCISCUS F.T VAN ODENHOVEN
JAN DAVIDSE
BY Frank R. Jerifari
AGENT

United States Patent Office 3,238,292

Patented Mar. 1, 1966

3,238,292

CIRCUIT ARRANGEMENT IN A COLOR TELEVISION RECEIVER FOR CONVERTING A TELEVISION SIGNAL RECEIVED INTO A DOT-SEQUENTIAL SIGNAL

Franciscus Ferdinand Theodorus van Odenhoven and Jan Davidse, both of Emmasingel, Eindhoven, Netherlands, assignors to North American Philips Company, Inc., New York, N.Y., a corporation of Delaware Filed Jan. 15, 1962, Ser. No. 166,284

Claims priority, application Netherlands, Jan. 24, 1961, 260,429

14 Claims. (Cl. 178—5.4)

The invention relates to a color television receiver circuit for converting a television signal received into a dot-sequential signal for appliction to a control electrode of a single-gun color picture tube. The television signal received, which is detected once, comprises a luminance signal and color signals modulated on a sub-carrier wave at different phase angles. In the circuit a local oscillator is included for regenerating the sub-carrier wave signal. The oscillator is synchronized by means of a reference signal (burst signal) present in the television signal received.

Such a circuit arrangement is known from the book "Principles of Color Television" of the Hazeltine Laboratory written by K. Mcilwain and C. E. Dean.

In this book it is stated on pages 442 to 450 that the desired monochromic correction signal ($M$–$Y$) can be obtained by separately filtering the colour signals modulated on the sub-carrier wave from the total signal and then multiplying them by a signal having the frequency of the sub-carrier wave.

The desired color signal is obtained by means of a separate so-called elliptic amplifier. For that purpose, the color signals modulated on the sub-carrier wave are supplied to the elliptic amplifier and multiplied in it by a signal having double the frequency of the sub-carrier wave.

The two signals thus obtained have to be derived by way of separate filters and then combined with one another and with the original luminance signal so as to obtain the desired dot-sequential signal which may be supplied to a control electrode of a single-gun color picture tube.

It will be clear that as a result of the great many processes to which the original television signal is subjected in the known circuit, a complicated system is necessary, and in addition, the direct current component is lost. This component has to be reintroduced in a separate stage.

The object of the invention is to provide a simple circuit for converting the television signal received into a dot-sequential signal while using a minimum of filters and circuit elements.

In order to realize this, the circuit arrangement according to the invention is characterized in that the conversion is carried out in a push-pull modulator, in which the said television signal is supplied to this modulator wholly or partially in phase. The circuit comprises means to cause the regenerated signal, which is supplied to the push-pull modulator entirely or partially in opposite phase, to contain frequencies which are equal to and which amount to double the frequency of the sub-carrier wave. In the output circuit of the modulator a low-pass filter is included which blocks signals with double and higher frequencies than the frequency of the sub-carrier wave.

In order that the invention may readily be carried into effect, some embodiments of circuit according to the invention will now be described, by way of example, with reference to the accompanying drawings, in which.

Figure 1:
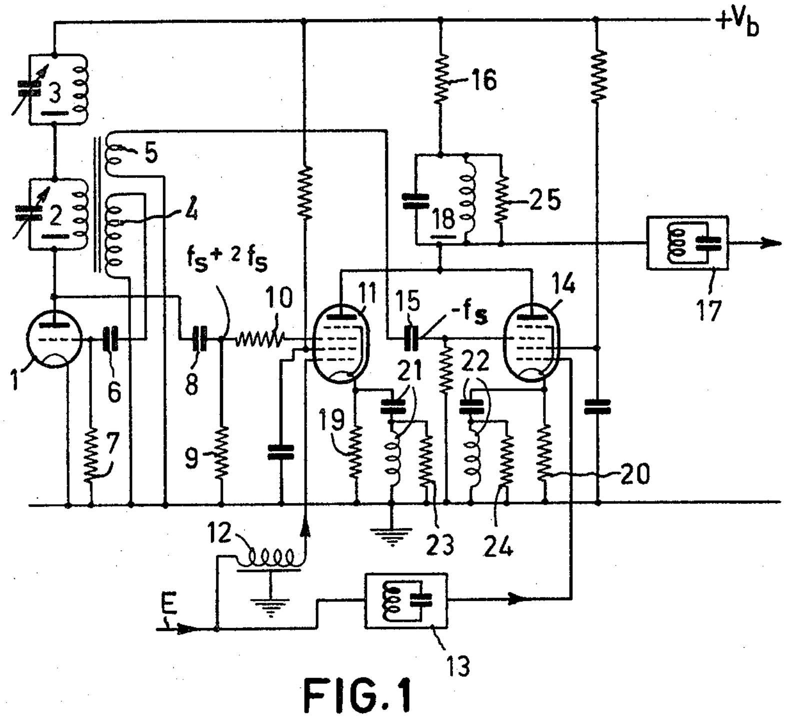
FIGURE 1 is a circuit diagram of a first embodiment of the invention in which two modulator tubes are included and in which so-called additional color amplification is used.

In FIGURE 1, the tube 1 is connected as an oscillator which produces inter alia a signal having the frequency $f_s$, namely the frequency of the sub-carrier wave on which the color signals of the once detected television signal received are modulated. The tube 1 which is connected, by way of example, as an oscillator feed back inductively, is synchronized in known manner (not shown) by means of a reference signal (burst signal) which is also derived from the television signal received.

The anode circuit of the tube 1 comprises the series arrangement of two circuits, namely the circuit 2 which is tuned to $f_s$ and the circuit 3 which is tuned to $2f_s$. The circuit 2 is coupled inductively to the windings 4 and 5. One terminal of the winding 4 is coupled through grid capacitor 6 and a leakage resistor 7 to the control grid of the tube 1. The other terminal of circuit is grounded. As a result of the right coupling between the circuit 2 and the winding 4, the generator circuit will be self-oscillating and a negative grid voltage can be produced by means of grid current, grid capacitor 6 and leakage resistor 7 so that the tube operates as a class C oscillator. As is known, the anode current of the tube 1 will in this case not only contain components having the frequency $f_s$ but also components having the frequencies $2f_s$, $3f_s$ and so on. The mutual ratio between the amplitudes of these components is determined by the measure of adjusting tube 1 in class C. By including in the anode circuit of tube 1 both a circuit tuned to $f_s$ and to $2f_s$, the signal and the anode of the tube 1 will have the form $$\cos(\omega_2 t+\varphi)+m\cos(2\omega_s t+\psi) \qquad (1)$$

where $\omega_s=2\pi f_s$, $t$ is the time, $\varphi$ a phase angle which may be adjusted, for example, by means of the variable capacitor in circuit 2, $\psi$ a phase angle which may be adjusted, for example, by means of the variable capacitor in circuit 3, and $m$ represents a constant of proportionality.

The signal shown in Formula 1 (which is indicated in the figures by $f_s+2f_s$) is supplied to the second control grid of the tube 11 via the coupling capacitor 8, the leakage resistor 9 and a small limiting resistor 10.

The same result can be obtained, if the signal which is derived from the oscillator tube 1 does not contain any harmonics. This is possible by not adjusting the tube 1 in class C and omitting the circuit 3. In in addition the signal received from the tube 1 is increased, the second control grid of the tube 11, in co-operation with the coupling capacitor 8 and the leakage resistor 9, can be adjusted in class C by grid current to this control grid. In addition, the limiting resistor 10 should be replaced by a parallel circuit (analogous to circuit 3) tuned to the frequency $2f_s$. Since only the peaks of the signal supplied to the second control grid cause grid current, the current through the latter parallel circuit also comprises a component with $2f_s$. Only this component will cause a voltage drop at the circuit tuned to $2f_s$, which voltage is added to the oscillator signal. Consequently, in this manner also a signal is operative at the second control grid of the tube 11 which signal has the frequency $f_s$ and the frequency $2f_s$. By varying the tuning of the parallel circuit which has replaced the resistor 10, the desired angle $\psi$ can be adjusted without the angle $\varphi$ being influenced. As a matter of fact, for the signal having the frequency $f_s$, the circuit substantially acts as a short-circuit.

The total television signal E detected once is supplied to the first control grid of the tube 11 via a delay circuit 12. This signal E for example has the form $$E=Y+\{\alpha(R-Y)+\alpha'(B-Y)\}\cos\omega_s t+\{\beta(B-Y)+\beta'(R-Y)\}\sin\omega_s t \quad (2)$$

where Y represents the luminance signal, R the red component, B the blue component of the color signals modulated on the auxiliary carrier wave, and $\alpha$, $\alpha'$, $\beta$ and $\beta'$ are constants of proportionality. The luminance signal Y also comprises the green component G, so that the signal E comprises the three color components R, G and B.

For the N.T.S.C. (National Television System Committee)-signal developed in the United States of America, $$\alpha=\frac{1}{1.14},\beta=\frac{1}{2.03}\text{ and }\alpha'=\beta'=0$$

while the luminance signal Y is given by $$Y=0.03R+0.50G+0.11B$$

The total television signal E is also supplied to the first control grid of the tube 14 via a low pass filter 13 which has substantially the same delay time as the delay circuit 12. The filter 13 is proportioned so that only the luminance signal Y is passed, so that only this signal is operative at the first control grid of the tube 14.

It is noted that the signal Y also comprises so-called higher frequency components (mixed highs) which are filtered by the filter 13 it is true, but which are present in the signal Y supplied to the first control grid of the tube 11, so that they are brought into the ultimate output signal via this latter tube.

The second control grid of the tube 14 is connected to one terminal of the winding 5 through the coupling capacitor 15. This latter winding is coupled inductively exclusively to the circuit 2 in a manner such that a signal of the form $$-\cos(\omega_s t+\varphi) \quad (3)$$

is operative at the second control grid of the tube 14. This signal is indicated in the figures by $-f_s$.

The anodes of the tubes 11 and 14 are connected to the supply voltage $+V_b$ through a common anode resistor 16. The output signal developed at the anodes of the tubes 11 and 14 is derived by way of a low-pass filter 17. This filter passes the converted luminance signal and the converted color signal, but signals having the frequencies $2f_s$, $3f_s$ and so on, are suppressed by this filter.

Therefore, with the embodiment shown in FIGURE 1 it is possible to obtain in a very simple manner the total converted signal, in which only two low-pass filters 13 and 17 and one delay circuit 12 are required as well as two modulator tubes 11 and 14. Moreover, one has the additional advantage that the signal represents by the Formula 1 can be obtained from one single oscillator tube. In the older methods, the signals $$\cos(\omega_s t+\varphi)$$

and $$m.\cos(2\omega_s t+\psi)$$

had to be produced separately, which render a separate multiplication stage necessary.

In addition, the conversion may be carried out at a high level, so that the output signal of filter 17 can be supplied directly to a control electrode of a single-gun picture tube. In this manner, the direct current component is not lost, so that no separate direct current lead-in circuit is necessary.

That the desired signal is obtained indeed at the output of the filter 17 can be proved as follows, in which for convenience the figures of the N.T.S.C.-signal are used. It will be clear, however, that the circuit arrangement according to the invention may be used for a signal other than the N.T.S.C.-signal. In that case, only the various constants which are found from the calculation and which may be adjusted by means of the circuit elements have to be given different values.

The tube 11 operates as a mixing circuit, so that the output signal $I_{11}$ of this tube is given by $$\begin{aligned}I_{11}=Y&+\frac{R-Y}{1.14}\cos\omega_s t+\frac{B+Y}{2.03}\sin\omega_s t+\cos(\omega_s t+\varphi)\\&+m.\cos(2\omega_s t+\psi)+AY\cos(\omega_s t+\varphi)\\&+mAY\cos(2\omega_s t+\rho)+A.\frac{R-Y}{1.14}\cos\omega_s t.\cos(\omega_s t+\varphi)\\&+m.A.\frac{R-Y}{1.14}\cos\omega_s t.\cos(2\omega_s t+\psi)\\&+A\frac{B-Y}{2.03}\sin\omega_s t.\cos(\omega_s t+\varphi)\\&+mA\frac{B-Y}{2.03}\sin\omega_s t.\cos(2\omega_s t+\psi)\end{aligned} \quad (4)$$

In Formula (4) it is assumed for convenience that the amplification proper of the components supplied (Formulae 1 and 2), in the tube 11 is equal to 1 and the conversion amplification equal to A. If the amplification proper is unequal to 1 but, for example, equal to P, the conversion amplification may be said to be equal to $P\times A$ and Formula 4 has to be multiplied by P.

The signals Y and $-\cos(\omega_s t+\varphi)$ respectively are supplied to the tube 14. The delay circuit 12 has substantially the same delay time as the filter 13 so that no separate phase shift in the signal Y which is supplied to the tube 14 need be introduced. In addition, it should be ensured that the tube 14 has the same amplification proper and the same conversion amplification as the tube 11.

For the output signal of tube 14 may then be written $$I_{14}=Y-\cos(\omega_s t+\varphi)-YA\cos(\omega_s t+\varphi) \quad (5)$$

A voltage is developed at the resistor 16 which is proportional to the sum of the signals $I_{11}$ and $I_{14}$. This voltage is derived via the low-pass filter 17 which filters signals having the frequencies $2f_s$, $3f_s$ and so on, so that for the signal at the output of the filter 17

$$\begin{aligned}V_{17}=-\Big[2Y&+\left\{\frac{A}{2}\frac{R-Y}{1.14}\cos\varphi-\frac{A}{2}\frac{B-Y}{2.03}\sin\varphi\right\}\\&+A\left\{\frac{m}{2}\frac{R-Y}{1.14}\cos(\omega_s t+\psi)-\frac{m}{2}\frac{B-Y}{2.03}\sin(\omega_s t+\varphi)\right\}\\&+\frac{R-Y}{1.14}\cos\omega_s t+\frac{B-Y}{2.03}\sin\omega_s t\Big]\end{aligned} \quad (6)$$

may be written.

(The — mark before the large brackets in Formula 6 serves to indicate the phase shift of 180° in the tubes 11 and 14.)

It is noted that the term $$m\cos(2\omega_s t+\psi)$$

which still occurs in Formula 4 has disappeared from the Formula 6, since this term is filtered by means of the filter 17. In principle, also a signal of the form $$-\cos(\omega_s t+\varphi)-m\cos(2\omega_s t+\psi)$$

could be supplied to the second control grid of the tube 14 so as to be able to remove from Formula 4 the terms which are equal but which are of opposite sign after multiplication in the tube 14. However, as indicated above, only the term $$-\cos(\omega_s t+\varphi)$$

is strictly necessary.

For the N.T.S.C.—signal, as proved in the said book (Principles of Color Television) (see page 445, Formula 16–9), $$M-Y=0.19\frac{R-Y}{1.14}+0.55\frac{B-Y}{2.03} \quad (7)$$

should hold for the monochrome correction signal.

Therefore, the signal $V_{17}$ will contain the desired monochromic component M if $$\frac{A}{2}\frac{R-Y}{1.14}\cos\varphi-\frac{A}{2}\frac{B-Y}{2.03}\sin\varphi=2(M-Y) \quad (8)$$

holds.

This condition is met if $$\frac{A}{2}\cdot\cos\varphi=0.38 \quad (9)$$

and $$\frac{A}{2}\cdot\sin\varphi=-1.10 \quad (10)$$

The values for A and $\varphi$ can be calculated from the Equations 9 and 10.

For the converted color signal, $$0.89(R-Y)\cos(\omega_s t-19^\circ)+0.74(B-Y)\sin(\omega_s t-21^\circ)$$

Should hold (see "Principles of Color Television", page 444 first paragraph).

Since the introduction of a constant phase shift into this latter signal does not present any objections, since such a constant phase shift can be removed in the color picture tube itself by introducing a corresponding but opposite phase shift and because also the amplitude of the converted color signal may freely be chosen.

$$K\{0.89(R-Y)\cos(\omega_s t+\delta)+0.74(B-Y)\sin(\omega_s t+\delta-2^\circ)\} \quad (11)$$

may be written for the converted color signal.

The signal $V_{17}$ therefore will comprise the desired color signal, if $$\frac{mA}{2}\frac{R-Y}{1.14}\cos(\omega_s t+\psi)+\frac{R-Y}{1.14}\cos\omega_s t=K.0.89.(R-Y).\cos(\omega_s t+\delta) \quad (12)$$

and $$\frac{-mA}{2}\frac{R-Y}{2.03}\sin(\omega_s t+\psi)+\frac{B-Y}{2.03}\sin\omega_s t=K.0.74.(B-Y).\sin(\omega_s t+\delta-2^0) \quad (13)$$

holds.

Since in the Equations 12 and 13 both the phase angles and the coefficients of the goniometric terms of left and right members have to be equal to one another, the Equations 12 and 13 yield the following four equations:

$$K.0.89\cos\delta=\frac{mA}{2.28}\cos\psi+\frac{1}{1.14} \quad (14)$$

$$K.0.89\sin\delta=\frac{mA}{2.28}\sin\psi \quad (15)$$

$$K.0.74\cos(\delta-2^\circ)=\frac{1}{2.03}-\frac{mA}{4.06}\cos\psi \quad (16)$$

$$K.0.74\sin(\psi-2^0)=-\frac{mA}{4.06}\sin\psi \quad (17)$$

From these latter four equations, the constants K, $\delta$, $\psi$ and $m$ can be solved, while the constants A and $\varphi$ can be found from the Equations 9 and 10. For the constant $\delta$ the value of 1°12′ is found. Therefore, a phase shift of approximately $-(19^\circ+1^\circ 12')=-20^\circ 12'$ must be introduced to obtain the desired color reproduction. In the so-called indexing tubes (apple tubes) this may be carried out in the indexing signal derived from the picture screen, on which signal the resulting dot-sequential signal has to be modulated. In the case of the so-called Chromatron tube (Lawrence tube), the desired phase shift can be introduced into the signal which is supplied to the color control grid.

For the constant K, the value 0.8 is found. Therefore, after introducing this value for the constant K, the ultimate signal becomes the form:

$$V_{17}=-[2M+0.8\{0.89(R-Y)\cos(\omega_s t+\delta)+0.74(B-Y)\sin(\omega_s t+\delta-2^\circ)\} \quad (18)$$

However, the signal at the output of the filter 17 should have a form $$V_{17}'=-2[M+0.89(R-Y)\cos(\omega_s t+\delta)+0.74(B-Y)\sin(\omega_s t+\delta-2^\circ)] \quad (19)$$

If the exact ratio between the amplitudes of the converted luminance signal and the converted color signal is to be present. A comparison of the Formulae 18 and 19 show that converted color signal has to be amplified additionally with respect to the converted luminance signal.

Figure 2:
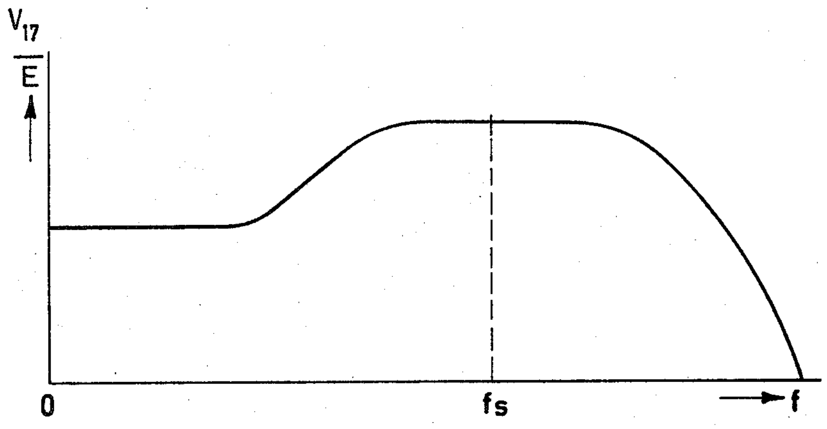
FIGURE 2 shows a frequency characteristic of the circuit of FIGURE 1.

In order to obtain this, so-called additional color amplification (Chromaboost) is used in the circuit arrangement shown in FIGURE 1. For this purpose, this circuit arrangement has a frequency characteristic as shown in FIGURE 2 when viewed from the input terminals, to which the signal E is supplied, to the output terminals after the filter 17. From this figure it follows that the total amplification around the auxiliary carrier wave frequency $f_s$ is larger than for the lower frequencies, so that the desired additional amplification of the color signals is obtained.

This can be realized by giving the filter 17 a frequency characteristic as shown in FIGURE 2. On the contrary, in the circuit arrangement shown in FIGURE 1, the principle of the frequency-dependent feedback coupling is used in combination with a parallel circuit 18 in series with the anode resistor 16. The frequency-dependent negative feed-back is realized by connecting the series circuits 21 and 22 parallel to the cathode resistors 19 and 20, which circuits are tuned to a frequency which is so much lower than the sub-carrier wave frequency $f_s$ as corresponds to approximately the bandwidth which is covered by one sideband of the color signals modulated on the sub-carrier wave. The circuits 18 is tuned to a frequency which is so much higher than $f_s$ as corresponds approximately to the bandwidth which is covered by one sideband of the color signals modulated on the sub-carrier wave. Naturally, the tuning frequencies might also be converted and the circuit 18 be tuned to a frequency which is lower than and the circuits 21 and 22 to a frequency which is higher than the sub-carrier wave frequency $f_s$. Damping resistors 23, 24 and 25 are provided to give the circuits 18, 21 and 22 the required bandwidth.

Figure 3:
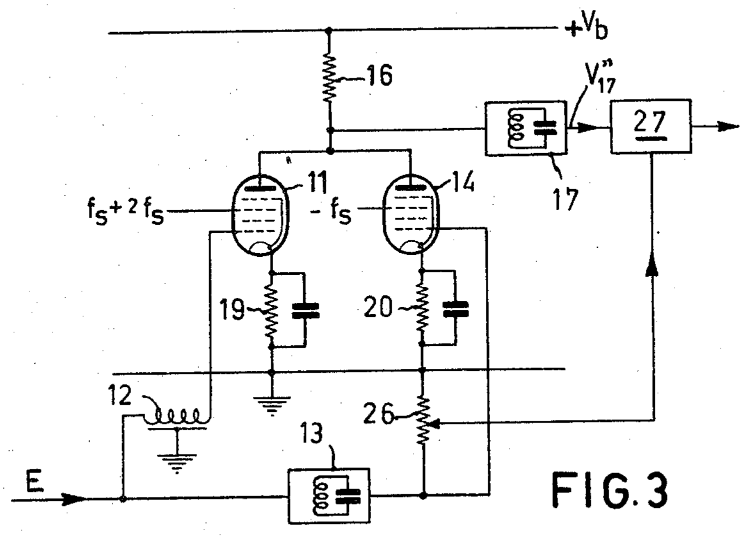
FIGURE 3 is an embodiment differing from that in FIGURE 1 in that no additional color amplification is used but the separate filtered luminance signal is added in the exact ratio to the converted signal.

Another solution to obtain the exact ratio between the said amplitudes is shown in FIGURE 3. In this figure, corresponding parts are given the corresponding numerals of FIGURE 1.

For the output voltage at the filter 17

$$V_{17}''=-[2Y+0.8(M-Y)+0.8\{0.89(R-Y)\cos(\omega_s t\delta)+0.74(B-Y)\sin(\omega_s t+\delta-2^\circ)\}] \quad (20)$$

may also be obtained if the associated values of A and $\varphi$ meet $$0.8(M-Y)=0.8\left\{0.19\frac{R-Y}{1.14}+0.55\frac{B-Y}{2.03}\right\}=\frac{A}{2}\cdot\frac{R-Y}{1.14}\cos\varphi-\frac{A}{2}\cdot\frac{B-Y}{2.03}\sin\varphi \quad (21)$$

(see also Formulae 6, 7 and 8).

By adding to the signal $V_{17}''$ a signal of the form 1.2Y, a signal is obtained of the same form as indicated in Formula 19 but with a smaller amplitude. However, this need not be an objection since as a rule so much additional reserve of pre-amplification is present that the input signal E can be amplified so much before supplying it to the circuit arrangement shown in FIGURE 3 than an output signal can be produced having the same amplitude as in the circuit arrangement shown in FIGURE 1.

Adding is carried out by supplying the signal Y, which is present at the output of filter 13, to an adding circuit arrangement 27 through a potentiometer circuit 26. In this adding circuit, the Y signal is amplified to the desired value of 1.2Y (or to 1.2PY if the amplification in the tubes 11 and 14 is not 1 but P, in which P may also be smaller than 1, so that then no additional amplification is required) and then added to the signal $V_{17}''$ which is also supplied to the adding circuit arrangement 27.

The circuit arrangement shown in FIGURE 3 has the advantage, as compared with the circuit arrangement shown in FIGURE 1, that the total frequency characteristic is less complicated. On the contrary, the adding circuit 27 gives an additional complication, so that it will have to be decided in each individual case which solution is to be preferred.

The above correction might also be omitted if one is content with an unexact ratio between convented luminance signal and convented color signal. For cheaper receivers, this additional correction might therefore be omitted.

It is noted that the adding may be carried out in the picture tube itself. In this case, the signal $V_{17}''$ may be supplied to a first control electrode and the signal 1.2Y' to another control electrode of the single-gun picture tube.

Figure 4:
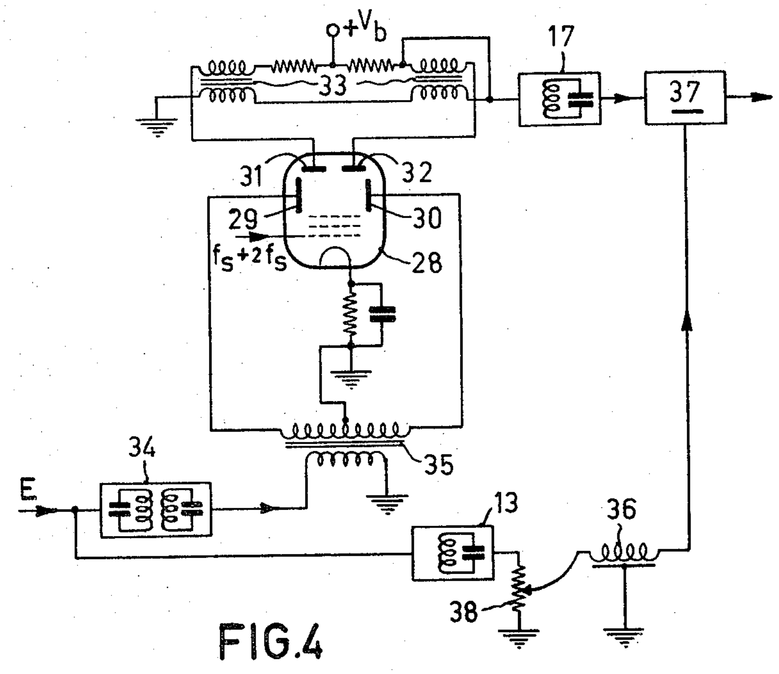
FIGURE 4 shows a third embodiment in which one single modulator tube with two anodes and two deflection plates is used.

A third solution is shown in FIGURE 4. In this case, a single so-called deflection tube 28 is used for the push-pull modulator. This tube comprises two deflection plates 29 and 30 and two anodes 31 and 32. By setting up a voltage at the plates 29 and 30, the electron beam emitted by the cathode is alternately deflected towards the anodes 31 and 32.

If the voltage at the first control grid of tube 28 is termed $U_g$, the deflection voltage which is set up at the deflection plate 29 is $U_d$ and that at the deflection plate 30 is $-U_d$, $$I_{a31}=(i_{ao}+SU_g)(a+bU_d)$$

may be written for the anode current $I_{a31}$ towards the anode 31 and $$I_{a32}=(i_{ao}+SU_g)(a-bU_d)$$

for the anode current $I_{a32}$ to anode, where $i_{ao}$ is the direct current, S the steepness, and $a$ and $b$ the deflection constants of the tube 28.

Because the supply voltage for the anodes 31 and 32 is supplied through the central tapping on the primary of the transformer 33, the voltage induced in the secondary of this transformer will be proportional to the difference of the anode currents $I_{a31}$ and $I_{a32}$. This difference is:

$$I_{a31}-I_{a32}=2i_{ao}bU_d+2SbU_gU_d \quad (22)$$

From Formula 22 it follows, that the output signal no longer contains the original grid signal $U_g$.

By supplying, according to the invention, the color signal modulated on the auxiliary carrier wave in opposite phase to the deflection plates 29 and 30 and setting up the signal shown in Formula 1 at the first control grid of the tube 28, the output signal, after passing the filter 17, will have the form indicated by Formula 6, but without the component 2Y. In order to obtain the ultimately desired signal, it is necessary therefore to add the Y signal to the output signal of filter 17.

All this is realised in FIGURE 4 by supplying the total once detected television signal E via a band filter 34 to the primary of a transformer 35. The two ends of the secondary of this transformer are connected to the deflection plates 29 and 30 respectively and its central tapping is connected to earth. The bandfilter 34 only passes the color signal modulated on the sub-carrier wave while the filter 13 only passes the Y signal. Since the delay time of a band-filter, such as 34, in general is larger than that of a low-pass filter, such as 13, an additional delay circuit 36 should in general be included in the supply lead to the adding circuit 37 in order to obtain the correct delay of the Y signal with respect to the output signal of filter 37. The exact value of the Y signal supplied to the adding circuit 37 can be adjusted by the potentiometer circuit 38 in a manner such that, after adding, the desired ratio is present between the amplitude of the converted luminance and color signals.

Figure 5:
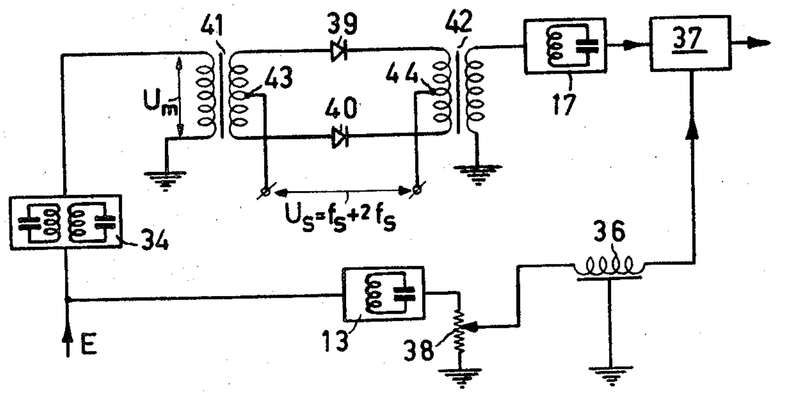
FIGURE 5 shows a fourth embodiment in which a push pull modulator known per se is used having two transformers and two diodes.

A similar solution as shown in FIGURE 4 is shown in FIGURE 5. In this figure, a push-pull modulator known per se comprising two diodes 39 and 40, a first transformer 41 and a second transformer 42 is used. The signal received from the oscillator tube 1 is supplied, if desired after preceding processing, between the central tappings 43 and 44, which signal is termed $U_s$ for convenience. The signal E is supplied to the primary of the transformer 41 through the band-filter 34, so that only the color signals modulated on the sub-carrier wave are set up at this winding, which signals are termed $U_m$ for convenience.

As is known, it holds for this push-pull modulator that the signal set up between the central tappings 43 and 44 no longer occurs in the signal produced at the secondary of the transformer 42. Therefore, $$V_{42}=\gamma U_m+\epsilon U_mU_s \quad (23)$$

may be written for this signal, where $\gamma$ and $\epsilon$ are constants of proportionality. This is a signal similar to that indicated by Formula 22, so that this output signal also, after passing the low-pass filter 17, will have a form as indicated in Formula 6 but without the Y signal. In a corresponding manner as in FIGURE 4, this Y signal is supplied to the signal $V_{42}$ in the exact ratio in the adding circuit 37. In this case also, the adding circuit 37 may be the picture tube itself, if desired.

What is claimed is:

1. A color television receiver circuit for converting a received detected color television signal into a dot-sequential signal, said television signals being of the type comprising a luminance signal and a chrominance signal comprising a plurality of color signals modulated on a subcarrier wave at different phase angles, said circuit comprising a source of reference oscillations of said subcarrier frequency and oscillations of the second harmonic of said subcarrier frequency, first modulator means for multiplying at least said chrominance signal part of said television signals, said oscillations of subcarrier frequency and said oscillations of the second harmonic of said subcarrier frequency, second modulator means for multiplying only one of said chrominance and luminance signals which is also multiplied in said first modulator means said television signals and at least said oscillations of subcarrier frequency, one of the signals multiplied in said second modulator means having a phase opposite to the phase of the corresponding signal multiplied in said first modulator means, means for adding the signal outputs of said first and second modulating means, whereby reference oscillations of said subcarrier frequency are canceled, low-pass filter means for removing signals of the frequency of twice said subcarrier frequency and higher from said added signals, and output circuit means connected to said low-pass filter means to provide said dot-sequential signal.

2. The circuit of claim 1, in which said source of reference oscillations of said subcarrier frequency and oscillations of the second harmonic of said subcarrier frequency comprises an oscillator having an output circuit, said output circuit comprising a first tuned circuit resonant at the frequency of said subcarrier wave and a second tuned circuit resonant at the frequency of the second harmonic of said subcarrier wave.

3. A color television receiver circuit for converting a received detected color television signal into a dot-sequential signal, said television signals being of the type comprising a luminance signal and a plurality of color signals modulated on a subcarrier wave at different phase angles, said circuit comprising a source of reference oscillations of said subcarrier frequency and oscillations of the second harmonic of said subcarrier frequency, first modulator means for multiplying said television signals, said oscillations of subcarrier frequency and said oscillations of the second harmonic of said subcarrier frequency, second modulator means for multiplying said luminance signal and said oscillations of subcarrier frequency, one of said signals multiplied in said second modulator means having a phase opposite to the phase of the corresponding signal multiplied in said first modulator means, means for adding the signal outputs of said first and second modulating means, low-pass filter means for removing signals of the frequency of twice said subcarrier frequency and higher from said added signals, and means for adding said luminance signal in predetermined proportion to the output of said low-pass filter means to provide said dot-sequential signal.

4. A color television receiver circuit for converting a received detected color television signal into a dot-sequential signal, said television signals being of the type comprising a luminance signal and a chrominance signal comprising a plurality of color signals modulated on a subcarrier wave at different phase angles, said circuit comprising a source of reference oscillations of said subcarrier frequency and oscillations of the second harmonic of said subcarrier frequency, a push-pull modulator having first and second pairs of input circuits and a common output circuit whereby the output signals of said modulator are added in said output circuit, means for applying said luminance signal with substantially the same relative phase to each input circuit of said first pair of input circuits and for applying said chrominance signal to the input circuit of one of said first pair of input circuits, means for applying said oscillations of subcarrier frequency with substantially opposite phases to the input circuits of said second pair of input circuits and for applying said oscillations of said second harmonic to at least one input circuit of said second pair of input circuits, and low-pass filter means connected to said output circuit for removing signals of said second harmonic and higher frequencies to provide said dot-sequential signal.

5. A color television receiver circuit for converting a received detected color television signal into a dot-sequential signal, said television signals being of the type comprising a luminance signal and a plurality of color signals modulated on a subcarrier wave at different phase angles, said circuit comprising a source of reference oscillations of said subcarrier frequency and oscillations of the second harmonic of said subcarrier frequency, a push-pull modulator comprising first and second electron discharge devices each having first and second control electrodes and an output electrode, common impedance means connected to said output electrode whereby the outputs of said modulator are added, means for applying said television signals to said first control electrode of said first discharge device, means applying said luminance signal to the first control electrode of said second discharge device at least partially in the same phase as said luminance signal is applied to the respective electrode of said first discharge device, means applying said oscillations of subcarrier frequency and said oscillations of the second harmonic to said second control electrode of said first discharge device, means applying said oscillations of subcarrier frequency to said second control electrode of said second discharge device at least partially in a phase opposite to the phase it is applied to the respective electrode of said first discharge device, and low-pass filter means connected to said common impedance means for removing signals of the frequency of said second harmonic and higher to provide said dot-sequential signal.

6. The circuit of claim 5, in which said source comprising a class C oscillator tuned to the frequency of said subcarrier wave and having an output circuit, and first and second tuned circuits resonant at said subcarrier wave frequency and the second harmonic thereof respectively connected in said output circuit of said oscillator.

7. The circuit of claim 5, in which said source comprises an oscillator for providing signals of said subcarrier wave frequency, and tuned circuit means resonant at said second harmonic frequency connected between said oscallator and second control electrode of said first discharge device, whereby said second harmonic appears across said tuned circuit due to grid current flow in said first discharge device.

8. The circuit of claim 5, comprising means for adding said luminance signal to the output of said low-pass filter means.

9. A color television receiver circuit for converting a received detected color television signal into a dot-sequential signal, said television signals being of the type comprising a luminance signal and a plurality of color signals modulated on a subcarrier wave at different phase angles, said circuit comprising a source of reference oscillations of said subcarrier freqeuncy and oscillations of the second harmonic of said subcarrier frequency, a push-pull modulator comprising first and second electron discharge devices each having a cathode electrode, first and second control electrodes, and an anode, common impedance means connected to said anodes whereby the output signals of said devcies are added, means for applying said television signals to said first control electrode of said first discharge device, means applying said luminance signal to the first control electrode of said second discharge device at least partially in the same phase as said luminance signal is applied to the respective electrode of said first discharge device, means applying said oscillations of subcarrier frequency and said oscillations of second harmonic frequency to said second control electrode of said first discharge device, means applying said oscillation of subcarrier frequency to said second control electrode of said second discharge device at least partially in a phase opposite to the phase it is applied to the respective electrode of said second discharge device, and low-pass filter means connected to said common impedance means for removing signals of the frequency of said second harmonic and higher frequencies to provide said dot-sequential signal, said receiver circuit having a high amplification of signals in the frequency band around said subcarrier wave frequency than for frequencies below said band.

10. The circuit of claim 9, in which said low-pass filter means has a frequency pass characteristic in which signals in the frequency band around said subcarrier wave frequency are attenuated to a less extent than frequencies below said band.

11. The circuit of claim 9, comprising a parallel resonant circuit connected in series with said impedance means, and first and second series resonant circuits connected in the cathode circuits of said first and second devices, respectively, said first and second series resonant circuts each being resonant at a frequency substantially below said subcarrier wave frequency, and said parallal resonant circuit being resonant at a frequency substantially above the frequency of said subcarrier wave, said resonant circuits providing dependent negative feedback.

12. A color television receiver circuit for converting a received detected color television signal into a dot-sequential signal, said television signals being of the form:

$$Y+\alpha(R-Y)\cos\omega t+\beta(B-Y)\sin\omega t$$

wherein Y is a luminance signal, R and B are color signals, $\alpha$ and $\beta$ are constants, and $\omega$ is the angular frequency of a subcarrier wave on which the color difference signals $R-Y$ and $B-Y$ are modulated, said circuit comprising a source of reference oscillations of frequency $\omega$ and oscillation of frequency $2\omega$, first modulator means for mixing said television signals and the reference oscillations of frequency $\omega$ and $2\omega$, second modulator means for mixing at least said luminance signal and the reference oscillations of frequency $\omega$, the phase of one of said luminance signal and reference oscillations mixed in said second modulator means being opposite with respect to the signal mixed in said first modulator means, means for adding the outputs of said first and second modulator means, and low-pass filter means for removing signals of frequency $2\omega$ and higher from the added output signals of said modulator means to provide said dot-sequential signal.

13. A color televesion receiver circuit for converting a receiving detected color television signal into a dot-sequential signal, said television signal being of the type comprising a luminance signal and a chrominance signal comprising a plurality of color signals modulated on a subcarrier wave at different phase angles, said circuit comprising a source of reference oscillations of said subcarrier frequency and oscillations of the second harmonic of said subcarrier frequency, a deflection tube having at least first and second deflection plates, first and second anodes, and a control electrode, means for applying said chrominance signal with opposite phases to said first and second deflection plates, means to apply said reference oscillations of said subcarrier wave frequency and oscillations of said second harmonic to said control electrode, means for adding the voltages at said first and second anodes, low-pass filter means for remoting signals of the frequency of said second harmonic and higher from said added voltages, and means for adding said luminance siganl of predetermined amplitude to said filtered added voltage to provide said dot-sequential signal.

14. A color television receiver circuit for converting a received detected color television signal into a dot-sequential signal, said television signals being of the type comprising a luminance signal and a chrominance signal comprising a plurality of color signals modulated on a subcarrier wave at different phase angles, said circuit comprising a source of reference oscillations of said subcarrier frequency and oscillations of the second harmonic of said subcarrier frequency, first and second diodes, a first transformer having a primary winding and a tapped secondary winding, means applying said television chrominance signal to said primary winding, a second transformer having a tapped primary winding and a secondary winding, means connecting the ends of said tapped secondary winding between like electrodes of said diodes, means connecting said tapped primary winding between the remaining electrodes of said diodes, means connecting said source between the taps of said tapped primary and tapped secondary windings, low-pass filter means connected to the secondary winding of said second transformed for removing signals of the frequency of said subcarrier wave and higher, and means for adding said luminance signal in predetermined amplitude to the output of said filter means to provide said dot-sequential signals.

References Cited by the Examiner

UNITED STATES PATENTS

| | | | |
|---|---|---|---|
| 2,798,201 | 7/1957 | Moulton et al. | 178—5.4 |
| 2,864,951 | 12/1958 | Loughlin | 178—5.4 |
| 2,905,750 | 9/1959 | Ley | 178—5.4 |

DAVID G. REDINBAUGH, *Primary Examiner.*